United States Patent
Kalbus

(10) Patent No.: US 9,533,576 B2
(45) Date of Patent: Jan. 3, 2017

(54) CONTROL OF A USER EQUIPMENT BASED ON IN-VEHICLE POSITION

(71) Applicant: Harman Becker Automotive Systems GmbH, Karlsbad (DE)

(72) Inventor: Peter Kalbus, Karlsruhe (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 0 days.

(21) Appl. No.: 14/733,868

(22) Filed: Jun. 8, 2015

(65) Prior Publication Data

US 2015/0360564 A1  Dec. 17, 2015

(30) Foreign Application Priority Data

Jun. 17, 2014 (EP) .................................... 14172794

(51) Int. Cl.
*B60K 35/00* (2006.01)
*H04W 4/04* (2009.01)
*G01C 21/34* (2006.01)

(52) U.S. Cl.
CPC .............. *B60K 35/00* (2013.01); *G01C 21/34* (2013.01); *H04W 4/046* (2013.01); *B60K 2350/906* (2013.01)

(58) Field of Classification Search
CPC .. B60K 35/00; B60K 2350/906; H04W 4/046; G01C 21/34
See application file for complete search history.

(56) References Cited

U.S. PATENT DOCUMENTS

| | | | |
|---|---|---|---|
| 2011/0021213 A1* | 1/2011 | Carr ..................... | H04B 5/0031 455/456.4 |
| 2011/0295458 A1* | 12/2011 | Halsey-Fenderson . | B60K 28/10 701/29.1 |
| 2012/0129544 A1 | 5/2012 | Hodis et al. | |
| 2012/0220284 A1* | 8/2012 | Tadayon ................. | H04M 3/53 455/418 |
| 2013/0150004 A1* | 6/2013 | Rosen .................... | H04W 8/22 455/414.1 |
| 2013/0210406 A1* | 8/2013 | Vidal ..................... | H04W 4/00 455/418 |
| 2013/0217331 A1* | 8/2013 | Manente ............... | H04W 4/008 455/41.2 |
| 2013/0303143 A1* | 11/2013 | Schrader ............... | H04W 12/08 455/418 |
| 2014/0015683 A1* | 1/2014 | Subramanya ..... | H04M 1/72577 340/669 |
| 2014/0274023 A1* | 9/2014 | Rajeevalochana .... | H04W 4/027 455/418 |

OTHER PUBLICATIONS

European Search Report for Application No. 14 17 2794 dated Aug. 5, 2014.

* cited by examiner

*Primary Examiner* — Rodney Butler
*Assistant Examiner* — Frederick Brushaber
(74) *Attorney, Agent, or Firm* — Artegis Law Group, LLP

(57) ABSTRACT

A user equipment includes a positioning unit which is configured to determine a relative position of the user equipment within a reference coordinate system that is defined with respect to a vehicle. The user equipment further includes a processor configured to selectively enable or disable a user access to at least some features of in-vehicle entertainment and/or control based on the determined relative position.

15 Claims, 4 Drawing Sheets

CONTROL OF A USER EQUIPMENT BASED ON IN-VEHICLE POSITION

CROSS-REFERENCE TO RELATED APPLICATIONS

The present application claims priority to European patent application titled, "CONTROL OF A USER EQUIPMENT BASED ON IN-VEHICLE POSITION," filed on Jun. 17, 2014 and having application Ser. No. 14/172,794.1. The subject matter of this related application is hereby incorporated herein by reference.

TECHNICAL FIELD

Various embodiments relate to a user equipment comprising a positioning unit configured to determine a relative position within a reference coordinate system which is defined with respect to a vehicle and a processing unit configured to execute an application and to a method of controlling operation of a user equipment. In particular, various embodiments relate to techniques of controlling the user equipment based on the determined relative position within the reference coordinate system.

BACKGROUND

It is known to provide in-vehicle entertainment and/or control to users by means of user equipment such as portable personal devices, including: cell phones, tablet PCs, etc. In such scenarios, typically an application is executed by the user equipment. The application provides features to the user which relate to the in-vehicle entertainment and/or the control of various functionality of the vehicle. Features may relate to output of information to the user and input of information from the user.

Here it may be desirable to provide different features to different users. E.g., more or less or different features should be available to the driver of the vehicle if compared to rear-seat passengers of the vehicle. In other words, the access granted or denied to certain features may depend on the user of the user equipment. This need for user-dependent access to features may have its origin in legal aspects such as a limited cognitive load imposed to the driver, usability, e.g., providing a simplified view to the driver to facilitate easy access to functions, and localization, e.g., allowing rear-seat passengers local entertainment properties affecting the rear-seat seating positions only.

In order to provide such a user-dependent access to features, it is known to provide different applications which can be selectively executed by the user equipment. E.g., a first application is provided for the driver and a second application is provided for the rear-seat passengers; the first and second applications provide access to different features. It would also be possible to provide a plurality of user equipment within a vehicle such that different passengers of the car may use different user equipment where the different applications are executed.

However, such a solution faces certain restrictions. E.g., provisioning a plurality of user equipment and/or applications may increase the hardware and/or software development costs. Further, the system complexity may increase; e.g., it may be necessary to establish a connection between the vehicle and a plurality of user equipment, respectively between the vehicle and a plurality of applications.

Therefore, a need exists to provide a less complex and simplified control of a user equipment for in-vehicle entertainment and/or control. In particular, a need exists for control of a user equipment for in-vehicle entertainment and/or control which allows enabling or disabling access to certain features in dependence of the various users.

SUMMARY

This need is met by the features of the independent claims. The dependent claims define embodiments.

According to an aspect, a user equipment is provided. The user equipment comprises a positioning unit configured to determine a relative position of the user equipment within a reference coordinate system which is defined with respect to a vehicle. The user equipment further comprises a processing unit configured to execute an application. The application provides features of in-vehicle entertainment and/or control to a user of the user equipment. The processing unit is further configured to selectively enable or disable user access to at least some of the features of the application in dependence of the determined relative position.

The reference coordinate system may be defined such that different positions inside and/or outside of the vehicle may be distinguished from each other. The spatial resolution with which the positioning unit determines the relative position may vary; e.g., it is possible that the relative position is determined at a comparably high accuracy, e.g., on a length scale of centimetres or tens of centimetres. However, it is also possible that the positioning unit is configured to determine the relative position in terms of seating positions of the vehicle; e.g., the relative position may be discriminated between driver seating position, co-driver seating position, and rear-seat passenger seating position. Alternatively or additionally, it is also possible that the relative position distinguishes between a position inside and outside of the vehicle. As the relative position between the reference coordinate system being defined with respect to the vehicle is determined, this position may be independent or largely independent of a global movement of the vehicle together with the user equipment.

E.g., the user equipment may further comprise a human machine interface (HMI) such a display, voice input/output, user interface elements, etc. E.g., the processing unit may be configured to display a graphical user interface (GUI) of the application on the display. By means of the HMI, information may be output to the user and information may be received from the user as part of features. Such information may relate to in-vehicle entertainment and/or control. E.g., a movie or a radio programme or route guidance may be output to the user. E.g., the user may select a radio channel or may enter a trip destination. In general, the features may relate to such aspects as navigation of the vehicle, traffic, vehicle and passenger safety, communication, and other fields of vehicle control such as in-vehicle climate control, and access permissions to the vehicle. Depending on the determined relative position, none or some or all of these features may be enabled or disabled by the processing unit.

Enabling or disabling of a given feature may relate to: allowing or denying access of the user to receive and/or input information associated with the respective feature. This enabling of a certain feature may be achieved by denying a modification of parameters associated with the respective feature and/or hiding the respective feature in a GUI. E.g., a respective user interface element may be hidden in the GUI or otherwise indicated as non-selectable.

E.g., the processing unit may be further configured to select the GUI of the application in dependence of the relative position. In such a manner it may be possible to provide comparably simplified or comparably sophisticated graphical appearances in dependence of the position. E.g., if a position of the user equipment close to the driver of the vehicle is determined, a simplified graphical appearance may be appropriate in order to reduce the cognitive load imposed on the driver. In contrast, this may be of subordinate relevance if a position in the rear-part of the vehicle is determined as the respective passengers do not have to fulfil any driving tasks. A simplified graphical appearance may relate to: displaying a smaller number of accessible features per view; hiding certain features; and/or highlighting safety relevant features. In such a manner it may be possible to disable the user access to at least some of the features, depending on the selected GUI.

By the techniques as presented above, the following effects may be achieved: one and the same application executed by the processing unit of the user equipment may be dynamically adapted depending on the position. As typically different use cases have to be fulfilled depending on the relative position in the vehicle, respectively depending on the user associated with the relative position, it may be possible to adapt the respectively accessible set of features dynamically to the use cases which are relevant to the particular passenger of the vehicle using the user equipment. In particular, it may not be necessary to provide a plurality of user equipment, e.g., one for each use case and/or passenger. Moreover, it may not be necessary to develop and execute a plurality of different applications, e.g., one for each use case and/or passenger. Rather, one and the same user equipment and one and the same application may be employed where the accessible features are dynamically adapted.

In general, the techniques employed to determine the relative position are not particularly limited. It may be possible to employ one or more different techniques in order to obtain a more reliable result. E.g., the positioning unit may be configured to determine the relative position by determining a signal strength of an electromagnetic field emitted by a transceiver of the vehicle. E.g., the signal strength may be determined from dedicated measurements or determined from evaluation of reference signals transmitted via a wireless data connection between the positioning unit and the transceiver of the vehicle. In such a manner, e.g., in combination with explicit or implicit knowledge of a position of a transceiver within the relative coordinate system, the position may be determined In general, it is possible that there is only a single transceiver; however, it should be understood that it is also possible that there is a plurality of transceivers. In particular, it may be possible that the plurality of transceivers transmits electromagnetic signals at different frequencies and/or different signal levels. E.g., a plurality of transceivers may be employed to provide wireless connections employing different communication protocols, such as wireless local area network (W-LAN), near-field communication (NFC), or Bluetooth.

While in the embodiment as mentioned above the positioning unit determines the relative position in dependence of the signal strength of the electromagnetic field emitted by the transmitter of the vehicle, of course it would be possible that the electromagnetic field is emitted by a respective transmitter of the user equipment and received an interrelated receiver of the vehicle. Then the positioning unit may receive respective control data from the vehicle which either implicitly or explicitly indicates the relative position of the user equipment.

In a further scenario, the positioning unit may be configured to determine the relative position in dependence of the signal strength of at least two electromagnetic fields emitted by at least two transceivers of the vehicle and further in dependence of signal phases of the at least two electromagnetic fields. E.g., the positioning unit may be configured to employ triangulation techniques. Such techniques may rely on a time synchronization between the at least two transceivers which results in a fixed relation of the signal phases. Here it may be desirable that the at least two transceivers are located in substantially different solid angles with respect to the positioning unit—such an effect may be achieved if the at least two transceivers are located at substantially different positions of the vehicle. E.g., it may be possible that the at least two transceivers are located in different parts of the vehicle, e.g., in the front side, rear side and/or middle part of the vehicle. By such techniques, the accuracy of the determining of the relative position may comparably high.

Additionally or alternatively, the positioning unit may be configured to determine the relative position based on control data. The control data may be received via a data connection established between the user equipment and a transceiver of the vehicle. The control data may indicate occupancy of the seating positions of the vehicle. E.g., the knowledge about occupancy of a given seating position of the vehicle may be cross-correlated with a relative position determined of the user equipment by other techniques, e.g., based on the signal strength of the electromagnetic field as explained above. In such a manner, the results based on measurements by the user equipment itself may be validated by means of the control data which is received from the vehicle.

Further, the control data may implicitly or explicitly indicate the position of the user equipment. E.g., if a respective entity of the vehicle determines the position of the user equipment by respective monitoring, this knowledge may be provided to the user equipment.

The positioning unit may be configured to determine the relative position by determining the presence of a fixed line connection between the user equipment and an interface of the vehicle. E.g., the fixed line connection between the user equipment and the interface of a vehicle may be established by placing the user equipment in a cradle comprising an electrical connector. The cradle may be fixedly attached to the vehicle interior. From implicit or explicit knowledge of the arrangement the cradle, it may be possible to determine the relative position within the vehicle once the fixed line connection has been set up. E.g., there may be dedicated cradles for the driver, the co-driver, and/or the rear seat passengers. Therefore, depending on which cradle is employed for setting up the fixed line connection, it may be possible to conclude on the relative position of the user equipment within the vehicle.

It is also possible that the positioning unit is configured to determine a relative position by determining acceleration of the user equipment relative to acceleration of the vehicle. E.g., both the vehicle and the user equipment may be equipped with an acceleration sensor. It may be possible that the user equipment receives control data which includes an indication of the acceleration of the vehicle. Then it may be possible to compare the acceleration of the vehicle, e.g., caused by global movement of the vehicle, with the acceleration of the user equipment, e.g., caused by global movement of the vehicle and local movement of the user equipment within the reference coordinate system. From such a comparison, it may be possible to determine whether the user equipment is moved within the vehicle, i.e., within the reference coordinate system. In other words, it may be possible to eliminate or reduce global influences due to the movement of the vehicle from the acceleration measured at the user equipment.

It may also be possible that the positioning unit is configured to determine the relative position by establishing a wireless connection with the NFC transceiver of the vehicle. E.g., the NFC transceiver may be an electrically passive device such as a tag arranged in the vicinity of a seating position. By placing the user equipment in the close vicinity to the NFC transceiver, due to the limited range of the NFC, it may be possible to conclude on the relative position. E.g., a plurality of passive tags may be provided for each seating position within the vehicle, e.g., in the backrest or arm rests of a seat. If a user wants to start using the user equipment, in order to log on to the device it may be necessary to place the user equipment in the vicinity of the tag. By this, the enabling or disabling of the user access based on the thus determined position may be possible.

The positioning unit may be further configured to determine the relative position by receiving invisible or visible optical signals from a transceiver of the vehicle. E.g., the optical signals may be in the visible range of light or in the infrared regime. The positioning unit may comprise a position-sensitive device or the like which can determine the relative position with respect to the optical transceiver of the vehicle if a line of sight connection is available. It may be possible that a plurality of different transceivers is situated throughout the vehicle. Together with some identification encoded into the optical signals and explicit or implicit knowledge of the relative positioning of the transceivers within the reference coordinate system, it may be possible to determine the relative position of the user equipment.

The positioning unit may be further configured to determine the relative position by monitoring the vehicle interior with one or more cameras and detecting the user equipment from image data acquired with the one or more cameras.

As can be seen from the above, the particular techniques employed to determine the relative position are generally not limited. One or more of the various techniques as mentioned above may be employed independently or in conjunction. Depending on the required accuracy of the determined relative position, certain techniques may be more suited than other techniques. Sometimes it may only be required to determine the relative position at a comparably low accuracy, e.g., discriminating between the different seating positions. Sometimes it may be required to determine the relative position at a comparably high accuracy, i.e., at the length scale of centimetres or below.

It may be possible that the processing unit is configured to selectively enable or disable user access to at least some of the features of the application in dependence of access permissions assigned to a user associated with the determined relative position.

E.g., the access permissions of a user located in a driver seat of the vehicle may cover features selected from the group comprising: features relevant for navigation of the vehicles such as route planning, route guidance, and range estimation; features relevant for traffic awareness such as traffic messages, detour planning, traffic delays; features relevant for vehicle and passenger safety such as emergency functions, locking of doors, and panic button; features relevant for vehicle controls such as in-vehicle climate control, engine and gear control, and lighting control; features relevant for communication, such as call setup and internet access.

As can be seen from the above, in various scenarios the driver of the vehicle may be granted comprehensive access to the features of the in-vehicle control. However, at the same time the driver may be granted only limited access to features relevant to in-vehicle entertainment.

E.g., the access permissions of a user located in a rear seat of the vehicle may cover features selected from the group comprising: features relevant for rear seat entertainment; features relevant for communication such as call setup and internet access.

E.g., the access permissions of a user located outside the vehicle may cover features selected from the group comprising: vehicle access such as locking and unlocking of doors, opening and closing of doors, and emergency lockdown; in-vehicle climate control.

According to a further aspect, a method of controlling operation of a user equipment is provided. The user equipment is positioned in a reference coordinate system which is defined with respect to a vehicle. The method comprises a positioning unit determining a relative position of the user equipment within the reference coordinate system. The method further comprises a processing unit executing an application. The application provides features of in-vehicle entertainment and/or control to a user of the user equipment. The method further comprises the processing unit selectively enabling or disabling access to at least some of the features of the application in dependence of the determined relative position.

In general, the positioning unit may be a physical and/or functional entity which is a vehicle component or a component of the user equipment. Control data on the relative position may be exchanged between vehicle components and the user equipments, e.g., via a wireless or wired control channel.

For such a method, effects may be obtained which may be comparable to the effects which be obtained for a user equipment according to a further aspect of the present application.

BRIEF DESCRIPTION OF THE DRAWINGS

The foregoing and other features of embodiments will become more apparent from the following detailed description of the embodiments when read in conjunction with the accompanying drawings.

DETAILED DESCRIPTION

Figure 1:
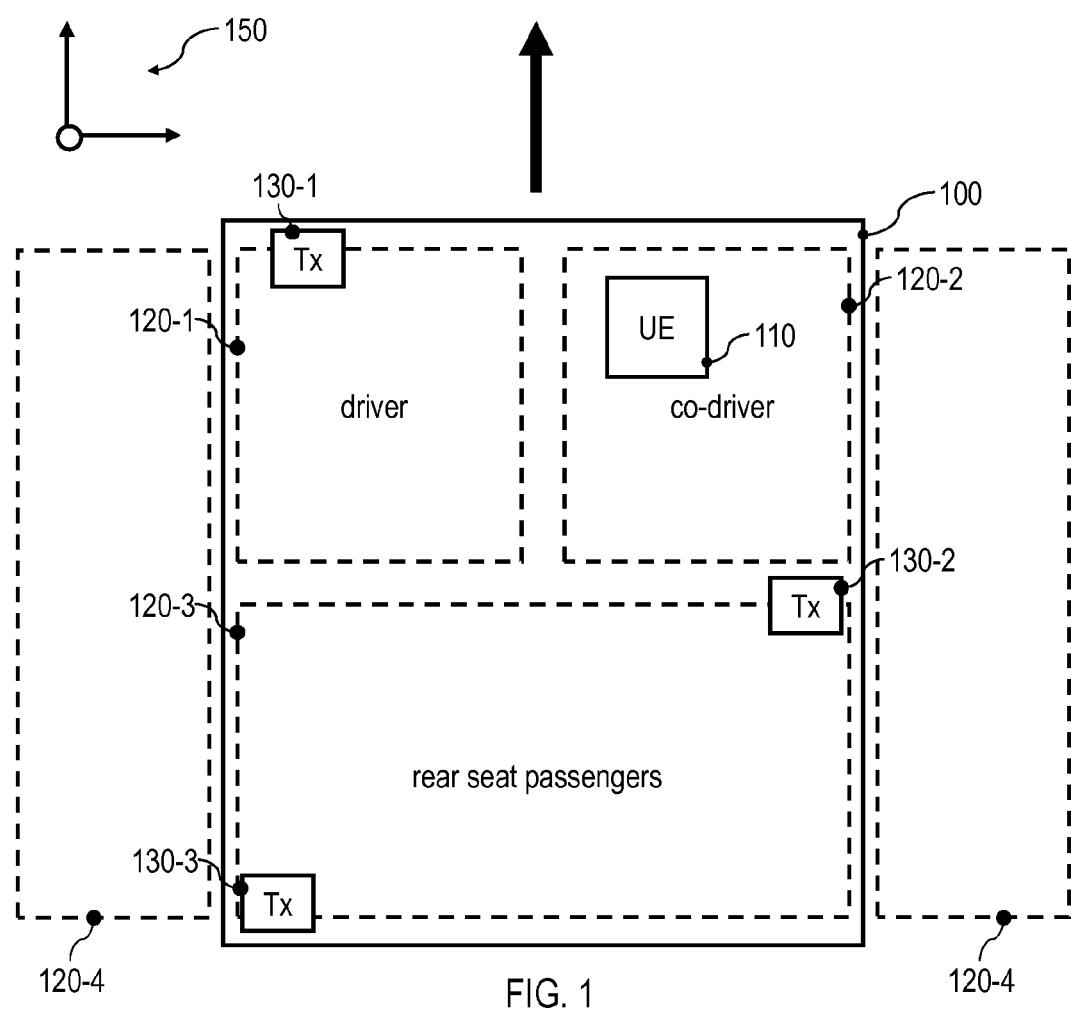
FIG. 1 is a schematic drawing of a vehicle and a user equipment.

In the drawings, like reference numerals denote like elements. The drawings are to be regarded as schematic representation of embodiments, and elements illustrated in the drawings are not necessarily shown to scale. Rather, the various elements are represented such that their function and general purpose become apparent to a person skilled in the art. Functional blocks or elements may be implemented as hardware, software, firmware, or a combination thereof Hereinafter, various techniques are explained which allow for position-dependent control of a user equipment that is configured to execute an application providing features of in-vehicle entertainment and/or control. Typically, a certain position within the vehicle may be associated with a particular user located at this position. By such means, it is possible to selectively enable or disable user access to at least some of the features in dependence of the particular position of the user equipment and its user within the vehicle (user-dependent access). Certain users may be associated with a particular position within the vehicle; e.g., if the user equipment is located in the front-left side of the vehicle, it may be concluded that the user of the user equipment is the driver of the vehicle; respectively, if the user equipment is positioned in the rear part of the vehicle, it may be concluded that the user of the user equipment is a rear seat passenger. It is then possible to enable or disable user access based on access permissions which are assigned to the respective user associated with the determined position in the vehicle. E.g., due to legal aspects, the driver of the vehicle may only have limited access to entertainment features. Likewise, due to safety reasons, rear seat passengers may only have limited access to vehicle control features.

In FIG. 1, a vehicle 100 is illustrated. In FIG. 1 the direction of front movement of the vehicle 100 is illustrated with the full black arrow. A user equipment (UE) 110 is located in the front-right side of the vehicle 100. The respective position 120-2 of the UE 110 is associated with the co-driver of the vehicle 100. The UE 110 is freely moveable within the vehicle 100 and also outside of the vehicle 100. Other positions hat the UE 110 may assume are associated with the driver 120-1 and the rear-seat passengers 120-3. Further, the UE 110 may assume a position 120-4 outside of the vehicle 100, e.g., close to the doors of the vehicle. In general, the relative position 120-1-120-4 of the UE 110 can be determined within a reference coordinate system 150 which is defined with respect to the vehicle 100. While in the scenario of FIG. 1 the position 120-1-120-4 is determined at a comparably low accuracy, respectively high granularity—where it is distinguished only between different seating positions—, it should be understood that, in general, it is also possible that the position 120-1-120-4 is determined at a higher accuracy, e.g., on the length scale of centimetres.

Once the relative position 120-1-120-4 of the UE 110 within the vehicle 100 is determined, it becomes possible to provide position-dependent, respectively user-dependent access to features of the respective application executed on the UE 110. E.g., driving related features may be enabled for the driver, i.e., when the UE 110 is located at the respective position 120-1; while such features may be disabled for rear-seat passengers, i.e., when the UE 110 is positioned at the respective position 120-3.

Figure 2:
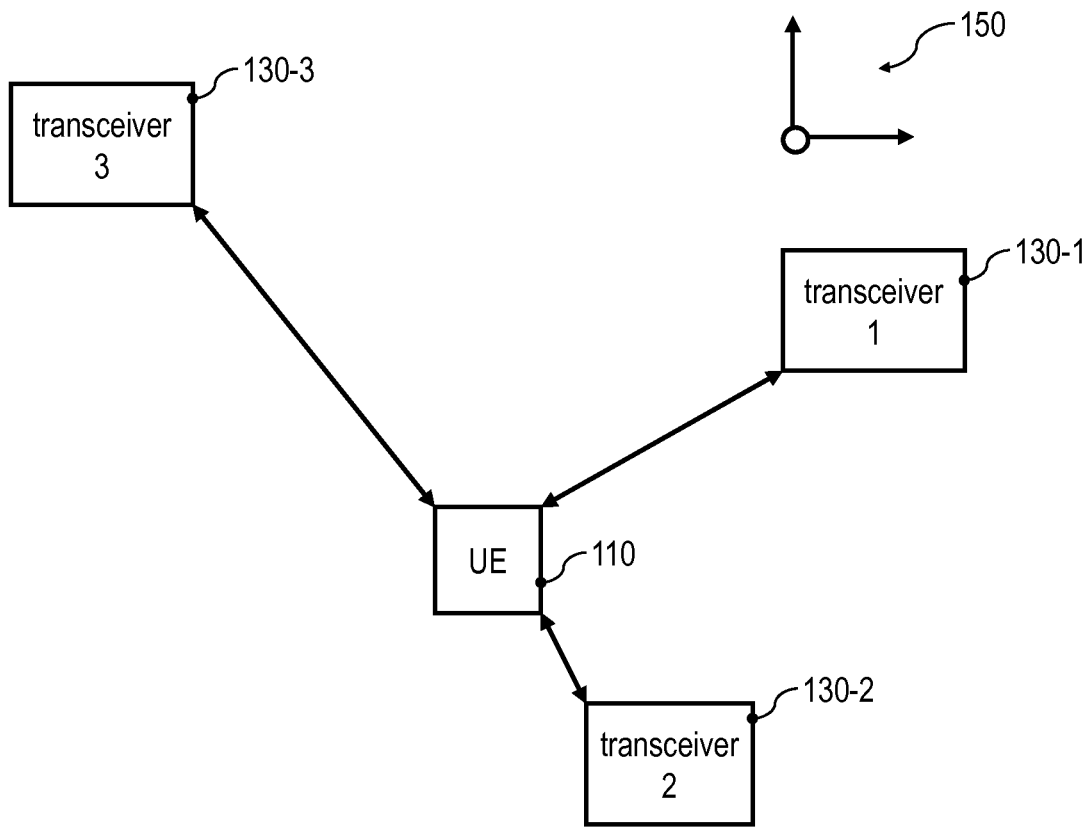
FIG. 2 shows details of determining of the position of the user equipment within the vehicle.

There exist various possibilities of determining the position of the UE 110. E.g., the UE 110 and/or the vehicle 100 can comprise a positioning unit (not shown in FIG. 1) which is configured to determine the relative position 120-1-120-4 by determining a signal strength of an electromagnetic field emitted by a transceiver 130-1, 130-2, 130-3 of the vehicle 100. For a larger (smaller) signal strength, it may be concluded that the UE 110 has a smaller (larger) distance to the respective transceiver 130-1-130-3. For such purposes, the UE 110 may alternatively or additionally be equipped with a transceiver (not shown in FIG. 1). It is also possible that—besides the signal strength—the positioning unit takes into account signal phases of the respective electromagnetic fields emitted by the transceivers 130-1-130-3; as shown in FIG. 2, techniques of triangulation, principally known to a person skilled in the art, may find an application. For this a time-synchronized setup of the transceivers 130-1-130-3 may be required. As the transceivers are mounted in different fixed positions within the vehicle, it becomes possible to determine the relative position of the UE 110 within the reference coordinate system 150. In FIG. 2, the transceivers 130-1-130-3 are situated in substantially opposing solid angles with respect to the UE 110—this may increase the accuracy in determining the relative position.

Figure 3:
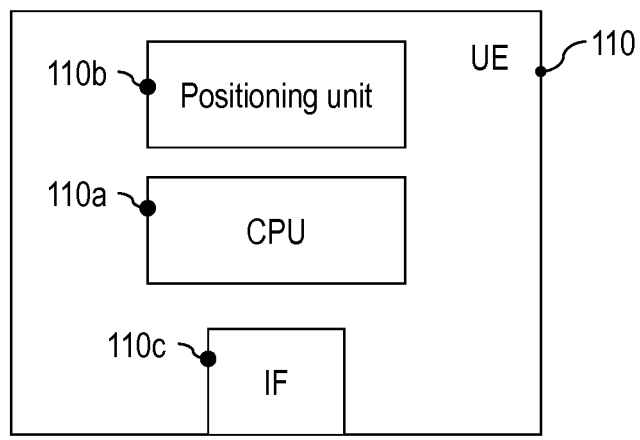
FIG. 3 is a schematic drawing of the user equipment.

FIG. 3 shows a schematic representation of the UE 110. Shown are the positioning unit 110b and a processor 110a which is configured to execute the application. Further shown is an interface 110c. The interface 110c may establish a wireless and/or fixed-line connection with vehicle 100. E.g., via electrical connectors provided as part of the interface 110c, a fixed line connection may be established with an inter-related cradle mounted at a fixed position of the vehicle 100. The positioning unit 110b can be configured to determine the relative position 120-1-120-4 by determining the fixed line connection. E.g., for the various positions 120-1-120-4 there may be separate dedicated cradles of the vehicle 100 provided. Then, by connecting the UE 110 with a certain cradle, it may be possible to conclude on the present position of the UE 11). In further scenarios, the positioning unit 110b can comprise, e.g., an acceleration sensor and can be configured to determine the relative position 120-1-120-4 by determining an acceleration of the UE 110 relative to the global acceleration of the vehicle 100. Typically, the acceleration of the UE 110 is a superposition of the global acceleration of the vehicle 100 and the acceleration 110 relative to the vehicle 100 within the reference coordinate system 150.

Yet a further scenario of determining the relative position 120-1-120-4 is to establish a wireless connection with a NFC transceiver 130-1-130-3 of the vehicle 100. Typically, NFC transceivers 130-1-130-3 have a limited range, e.g., on the length scales of a few centimetres. In turn, when a respective wireless communication with a NFC transceiver 130-1-130-3 is established, it may be possible to determine the position of the UE 110 at the same length scale. For this, e.g., passive NFC tags may be positioned throughout the vehicle. The NFC tags may have the respective position explicitly or implicitly encoded. In order to gain access to certain features of the application, it may be required that the user brings the UE 110 within the vicinity of such a tag such that the relative position with the reference coordinate system 150 may be determined.

Yet a further scenario of determining the relative position 120-1-120-4 is to provide optical transceivers 130-1-130-3 throughout the vehicle 100. E.g., the optical transceivers may emit or receive an invisible or visible optical signal. The positing unit 110b of the UE 110 may comprise, e.g., a position-sensitive device which detects such optical signals to determine the relative position 120-1-120-4. Additionally or alternatively, it is also possible that the UE 110 emits the visible or invisible optical signals and a position-sensitive device is mounted in the vehicle, i.e., fixed within the reference coordinate system 150. In a further scenario, it would be possible that optical cameras mounted within the vehicle 110 monitor the vehicle interior and recognize the UE 110 from image data. Also by such means it is possible to determine the position 120-1-120-4 of the UE 110 within the vehicle 100.

Figure 4:
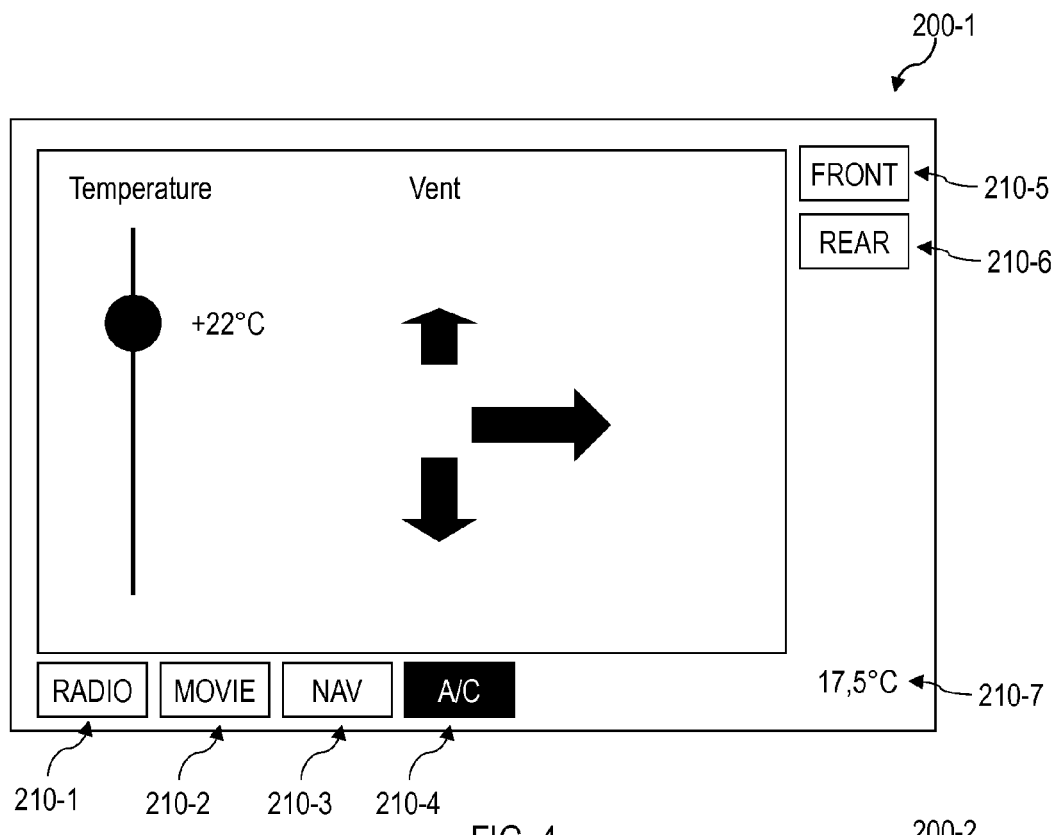
FIG. 4 shows a GUI of an application executed by the user equipment for a driver of the vehicle.

In FIG. 4, a GUI 200-1 of the application executed by the processing unit 110a is shown. The GUI 200-1 is selected if it is determined that the UE 110 is at the co-driver position 120-2 (cf. FIG. 1). In particular, the GUI 200-1 offers a number of features 210-1-210-6 to the user, i.e., to the co-driver. The features 210-1-210-2 relate to entertainment functionality, i.e., to radio and movie playback. The feature 210-3 relates to navigation of the vehicle. The feature 210-4—which, in the scenario of FIG. 4, is shown as currently being activated—relates to in-vehicle climate control. In the scenario of FIG. 4, the in-vehicle climate control feature 210-4 allows to set the temperature and the fan speed separately for the front of the vehicle via feature 210-5 and for the rear part of the vehicle via feature 210-6. As a further feature, a current temperature 210-7 is output to the user.

Figure 5:
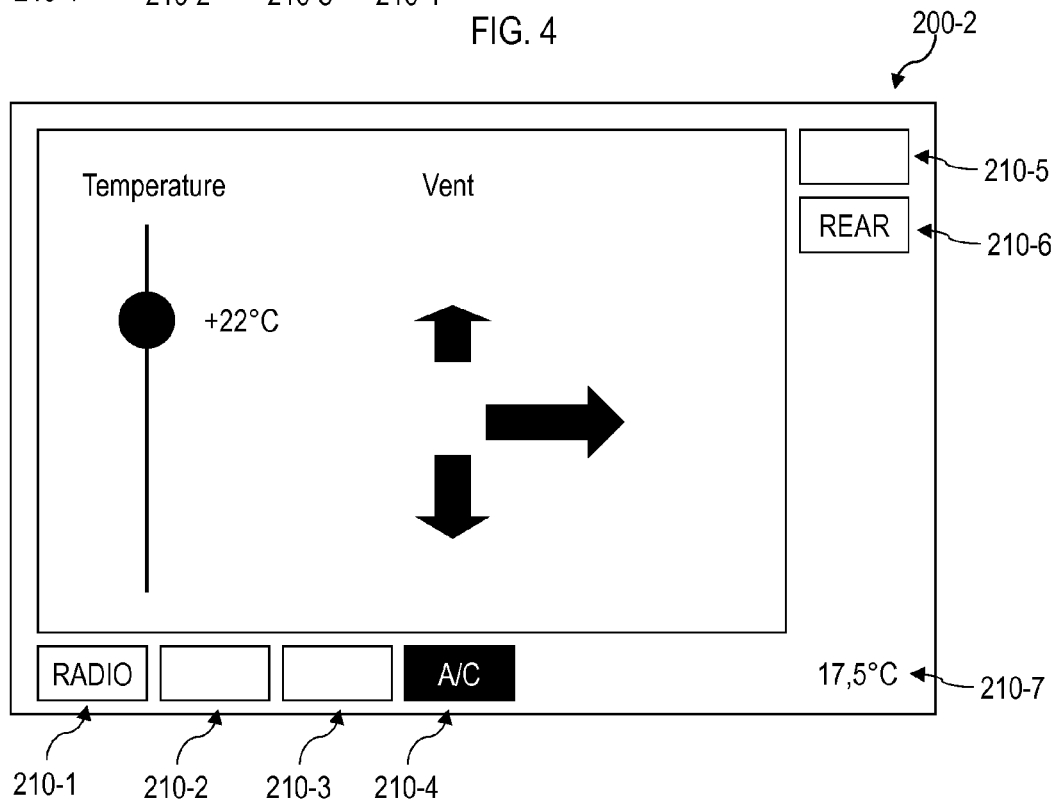
FIG. 5 shows a GUI an application executed by the user equipment for a rear seat passenger of the vehicle.

In FIG. 5, the GUI 210-2 is shown which is selected if the UE 110 is located in the rear seat passenger position 120-3 (cf. FIG. 1). As can be seen from a comparison of FIGS. 4 and 5, the features 210-2, 210-3, and 210-5 are disabled. Therefore, if the UE 100 is moved from the position 120-2 of the co-driver to the rear seat passenger position 120-3, the respective user access is dynamically disabled. This may be due to respective access permissions that are assigned to the respective users associated with a determined relative position 120-1-120-4. Various scenarios are conceivable on how the access permissions are assigned to the various users associated with the position throughout the vehicle 100 and the respective scenarios are not particularly limited.

Figure 6:
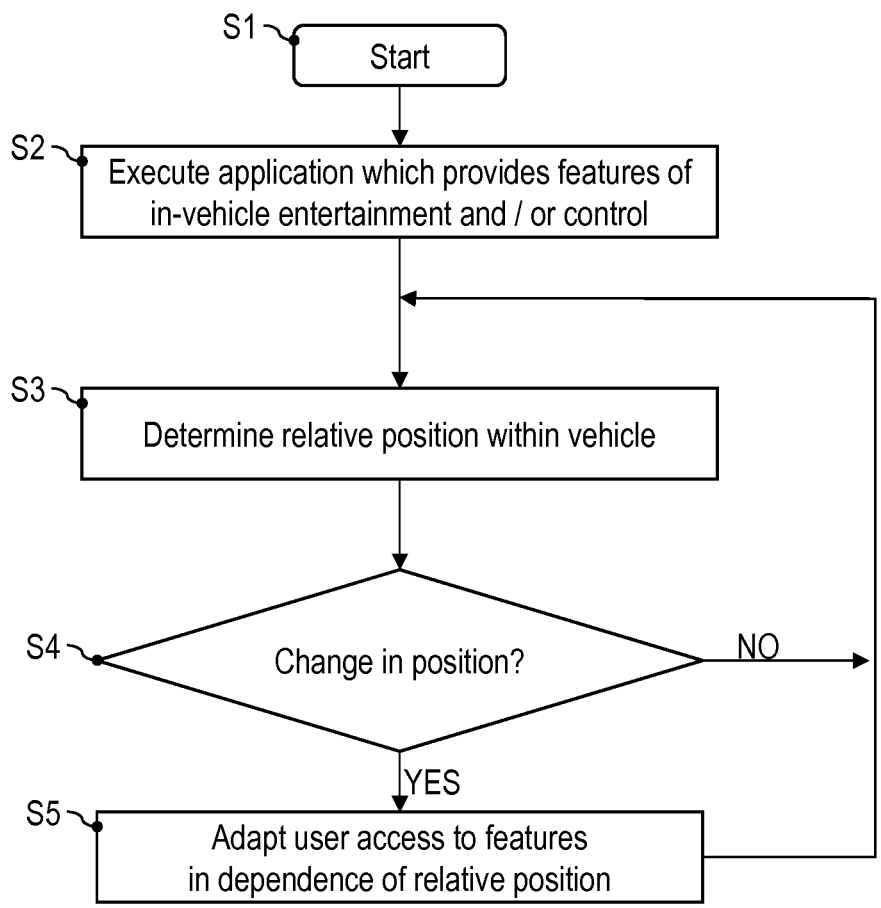
FIG. 6 is a flowchart of a method of controlling operation of a portable user equipment according to various embodiments.

In FIG. 6, a flowchart illustrates a method of controlling the operation of the UE 110. The method starts with step S1. In step S2, the application is executed which provides features of in-vehicle entertainment and/or control. Next, in step S2, the relative position 120-1-120-4 of the UE 110 within the reference coordinate system 150, i.e., within the vehicle 100, is determined In step S3, it is checked whether there is a change in position detected, e.g., if compared to the last determined position. If such a change in position is not detected, e.g., after a certain predefined idle time, step S2 is re-executed. However, if in step S3 a change in position 120-1-120-4 is detected, the method commences with step S4. In step S4, the user access to features 210-1-210-6 is adapted in dependence of the new determined relative position 120-1-120-4. When executing step S4, it is possible to take into account predefined access permissions assigned to a user associated with a determined relative position 120-1-120-4.

Although the invention has been described with respect to certain preferred embodiments, equivalents, combinations and modifications will occur to others skilled in the art upon reading and understand of the specification. The present invention includes all such equivalents, combinations and modifications and it is only limited by the scope of the appended claims.

The claimed invention is:

1. A user equipment, comprising:
   a positioning unit configured to determine a relative position of the user equipment within a reference coordinate system that is defined with respect to a vehicle; and
   a processor configured to:
      execute an application that provides one or more features associated with at least one of in-vehicle entertainment and in-vehicle control to a user of the user equipment, and
      when executing the application, selectively enable or disable user access to at least one feature of the application based on the relative position of the user equipment, wherein the at least one feature relates to at least one of vehicle entertainment or vehicle control.

2. The user equipment of claim 1, wherein the positioning unit is configured to determine the relative position of the user equipment by determining a signal strength of an electromagnetic field emitted by a transceiver associated with the vehicle.

3. The user equipment of claim 2, wherein the positioning unit is configured to determine the relative position based on signal strengths of at least two electromagnetic fields emitted by at least two transceivers associated with the vehicle and signal phases associated with the at least two electromagnetic fields.

4. The user equipment of claim 1, wherein the positioning unit is configured to determine the relative position of the user equipment based on control data received via a data connection established between the user equipment and a transceiver associated with the vehicle, the control data indicating an occupancy of seating positions of the vehicle.

5. The user equipment of claim 1, wherein the positioning unit is configured to determine the relative position of the user equipment by determining the presence of a fixed line connection between the user equipment and an interface associated with the vehicle.

6. The user equipment of claim 1, wherein the positioning unit is configured to determine the relative position of the user equipment by determining an acceleration associated with the user equipment relative to an acceleration associated with the vehicle.

7. The user equipment of claim 1, wherein the positioning unit is configured to determine the relative position of the user equipment by establishing a wireless connection with a near-field communications transceiver associated with the vehicle.

8. The user equipment of claim 1, wherein the positioning unit is configured to determine the relative position of the user equipment by receiving invisible or visible optical signals from a transceiver associated with the vehicle.

9. The user equipment of claim 1, wherein the processor is further configured to select and display a graphical user interface associated with the application based on the relative position of the user equipment.

10. The user equipment of claim 1, wherein the processor is further configured to selectively enable or disable user access to at least one feature of the application based on access permissions assigned to a user according to the relative position of the user equipment.

11. The user equipment of claim 10, wherein the access permissions assigned to a user located in a driver seat of the vehicle include at least one of:
   features relevant to navigating the vehicle, including at least one of route planning, route guidance, and range estimation,
   features related to traffic awareness, including at least one of traffic messages, detour planning, and traffic delays,
   features related to vehicle and passenger safety, including at least one of emergency functions, locking doors, and a panic button,
   features relevant to vehicle control, including at least one of in-vehicle climate control, engine and gear control, and lighting control, and
   features relevant to communications, including at least one of call setup and internet access.

12. The user equipment of claim 10, wherein the access permissions of a user located in a rear seat of the vehicle include at least one of features relevant to rear-seat entertainment, and features relevant to communications, including at least one of call setup and internet access.

13. The user equipment of claim 10, wherein the access permissions of a user located outside the vehicle include at least one of vehicle access, including at least one of locking and unlocking doors, opening and closing doors, and emergency lock down, and in-vehicle climate control.

14. The user equipment of claim 1, wherein the positioning unit is configured to determine the relative position of the user equipment according to seating positions defined within the vehicle.

15. A method of controlling operation of a user equipment positioned in a reference coordinate system that is defined with respect to a vehicle, the method comprising:
  determining a relative position of the user equipment within the reference coordinate system;
  executing an application that provides one or more features associated with at least one of in-vehicle entertainment and in-vehicle control to a user of the user equipment; and
  selectively enabling or disabling user access to at least one feature of the application based on the relative position of the user equipment, wherein the at least one feature relates to at least one of vehicle entertainment or vehicle control.

* * * * *